United States Patent [19]

Willson et al.

[11] 4,323,764
[45] Apr. 6, 1982

[54] CONTROL SYSTEM AND CONTROL DEVICE FOR CONTROLLING A HEATING UNIT AND METHOD OF MAKING AND OPERATING THE SAME

[75] Inventors: James R. Willson; William H. Conway; William N. Smith, all of Midlothian, Va.

[73] Assignee: Robertshaw Controls Company, Richmond, Va.

[21] Appl. No.: 170,716

[22] Filed: Jul. 21, 1980

[51] Int. Cl.³ .............................................. H05B 1/02
[52] U.S. Cl. .................................. 219/497; 219/490; 219/515; 219/491; 337/1; 338/31
[58] Field of Search ............... 219/493, 490, 511, 512, 219/513, 391, 496, 412, 413, 515; 337/1, 281; 338/29, 31

[56] References Cited

U.S. PATENT DOCUMENTS

| | | | |
|---|---|---|---|
| 2,272,188 | 2/1942 | Danielson | 338/31 X |
| 2,423,609 | 7/1947 | Middleton et al. | 338/29 |
| 2,573,041 | 10/1951 | May | 338/31 X |
| 2,862,093 | 11/1958 | Lennox | 219/512 |
| 3,419,707 | 12/1968 | Hild et al. | 219/391 |
| 3,483,360 | 12/1969 | Perry | 219/512 |
| 3,562,692 | 2/1971 | Bletz et al. | 219/512 |
| 3,842,232 | 10/1974 | Long | 219/513 |

FOREIGN PATENT DOCUMENTS 959473  3/1950  France ........................ 338/31

*Primary Examiner*—B. A. Reynolds
*Assistant Examiner*—M. Paschall
*Attorney, Agent, or Firm*—Candor, Candor & Tassone

[57] ABSTRACT

A control system for a heating unit that has controls for comparing a variable electrical signal that has a value in relation to the output temperature of the heating unit and a selected electrical signal that has a value in relation to a selected temperature setting to control the operation of the heating unit to tend to produce an output temperature substantially equal to the selected temperature, the controls including a control device having a rod and tube temperature sensing unit for providing linear motion of a part thereof in relation to the output temperature of the heating unit and having a potentiometer provided with an electrical output producing part operatively interconnected to the movable part of the rod and tube unit so as to produce the variable electrical signal in relation to the output temperature of the heating unit.

2 Claims, 5 Drawing Figures

CONTROL SYSTEM AND CONTROL DEVICE FOR CONTROLLING A HEATING UNIT AND METHOD OF MAKING AND OPERATING THE SAME

BACKGROUND OF THE INVENTION

1. Field of the Invention

This invention relates to an improved control system and control device for controlling the output temperature of a heating means as well as to methods of operating such a system and making such a control device.

2. Prior Art Statement

It is known to provide a control system for a heating means that has control means for comparing a variable electrical signal that has a value in relation to the output temperature of the heating means and a selected electrical signal that has a value in relation to a selected temperature setting to control the operation of a heating means to tend to produce an output temperature substantially equal to the selected temperature.

It is also known to provide a control device having a temperature sensing unit for providing motion of a part thereof in relation to the temperature being sensed by the unit, the device having electrical switch means operatively interconnected to the part to be operated thereby when the part is in a certain position thereof relative to the control device.

For example, see the U.S. Patent to Hild et al, U.S. Pat. No. 3,419,707, wherein such a known control device has a rod and tube temperature sensing unit for providing linear motion of the part thereof in relation to the temperature being sensed by the unit, the movable part thereof operating electrical switch means.

It is also known to provide a bellows operated rheostat or potentiometer wherein the wiper arm of the rheostat is pivotally positioned relative to the coil means of the rheostat by a bellows operated temperature sensing means. For example, see the U.S. Patent to Middleton et al, U.S. Pat. No. 2,423,609.

SUMMARY OF THE INVENTION

It is a feature of this invention to provide an improved control system for a heating means wherein control means are provided for comparing a variable electrical signal that has a value in relation to the output temperature of the heating means and a selected electrical signal that has a value in relation to a selected temperature setting to control the operation of the heating means to tend to produce an output temperature substantially equal to the selected temperature.

This feature of this invention is accomplished by utilizing a unique control device of this invention that has rod and tube temperature sensing unit in combination with a potentiometer.

In particular, one embodiment of this invention provides a control system for a heating means that has control means for comparing a variable electrical signal that has a value in relation to the output temperature of the heating means and a selected electrical signal that has a value in relation to a selected temperature setting to control the operation of the heating means to tend to produce an output temperature substantially equal to the selected temperature, the control means comprising a control device having a rod and tube temperature sensing unit for providing linear motion of a part thereof in relation to the output temperature of the heating means and having a potentiometer provided with an electrical output producing means operatively interconnected to the part of the unit so as to produce the variable electrical signal in relation to the output temperature of the heating means.

It is also a feature of this invention to provide a control device for such a system or the like wherein the same has a temperature sensing unit for providing motion of a part thereof in relation to the temperature being sensed by the unit with the movement of that part providing a dual function.

This feature is accomplished by having the movable part of the temperature sensing unit operate an electrical switch as well as a variable electrical signal output producing means.

In particular, one embodiment of this invention provides a control device having a temperature sensing unit for providing motion of a part thereof in relation to the temperature being sensed by the unit, the device having an electrical switch means operatively interconnected to the part to be operated thereby when the part is in a certain position thereof relative to the control device. The control device also has a variable electrical signal output producing means operatively associated with the part for providing an electrical signal having a value in relation to the temperature being sensed by the unit.

It is another feature of this invention to provide a rod and tube temperature sensing unit that can be utilized in the aforementioned control system for producing an electrical signal having a value in relation to the temperature being sensed by the unit.

In particular, one embodiment of this invention provides a control device having a rod and tube temperature sensing unit for providing linear motion of a part thereof in relation to the temperature being sensed by the unit, a potentiometer being carried by the device and having an electrical output producing means operatively interconnected to the part of the unit so as to have the electrical output of the potentiometer controlled in relation to the temperature being sensed by the unit.

Accordingly, it is an object of this invention to provide an improved control system having one or more of the novel features of this invention as set forth above or hereinafter shown or described.

Another object of this invention is to provide a method of operating such a control system or the like, the method of this invention having one or more of the novel features of this invention as set forth above or hereinafter shown or described.

Another object of this invention is to provide an improved control device for such a system or the like, the control device of this invention having one or more of the novel features of this invention as set forth above or hereinafter shown or described.

Another object of this invention is to provide a method of making such a control device or the like, the method of this invention having one or more of the novel features of this invention as set forth above or hereinafter shown or described.

Other objects, uses, and advantages of this invention are apparent from a reading of this description which proceed with reference to the accompanying drawings forming a part thereof and wherein:

DESCRIPTION OF THE PREFERRED EMBODIMENT

Figure 3:
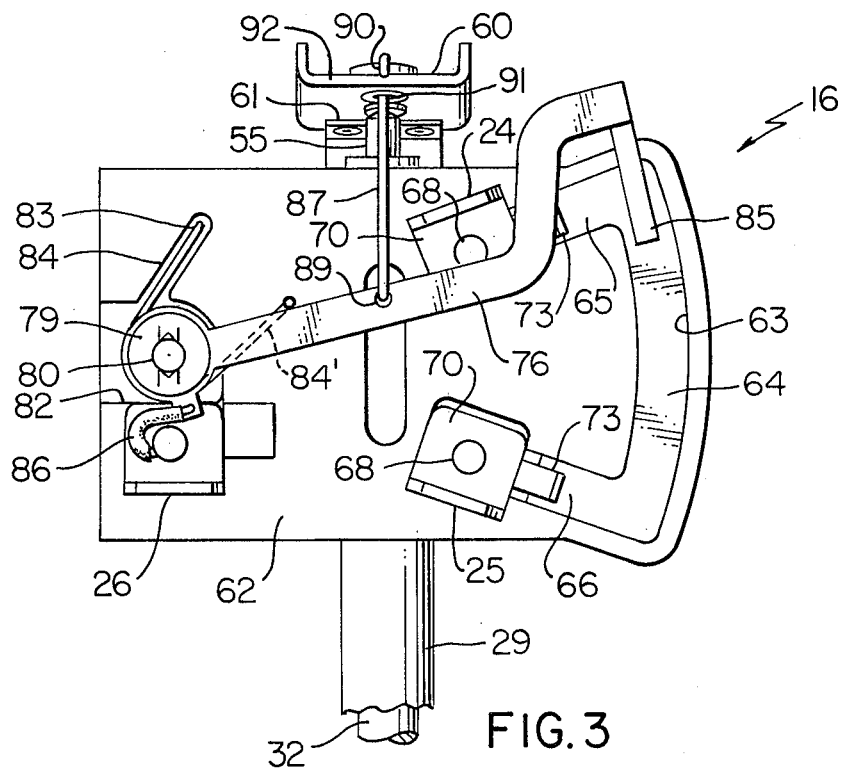
FIG. 3 is a fragmentary end view of the control device illustrated in FIG. 2 and is taken in the direction of the arrows 3—3 of FIG. 2.

While the various features of this invention are hereinafter described and illustrated as being particularly adapted to provide a control means for the heating means of a cooking apparatus, it is to be understood that the various features of this invention can be utilized singly or in any combination of to provide control means for heater means of other types of apparatus as desired.

Therefore, this invention is not to be limited to only the embodiment illustrated in the drawings, because the drawings are merely utilized to illustrate one of the wide variety of uses of this invention.

Figure 1:
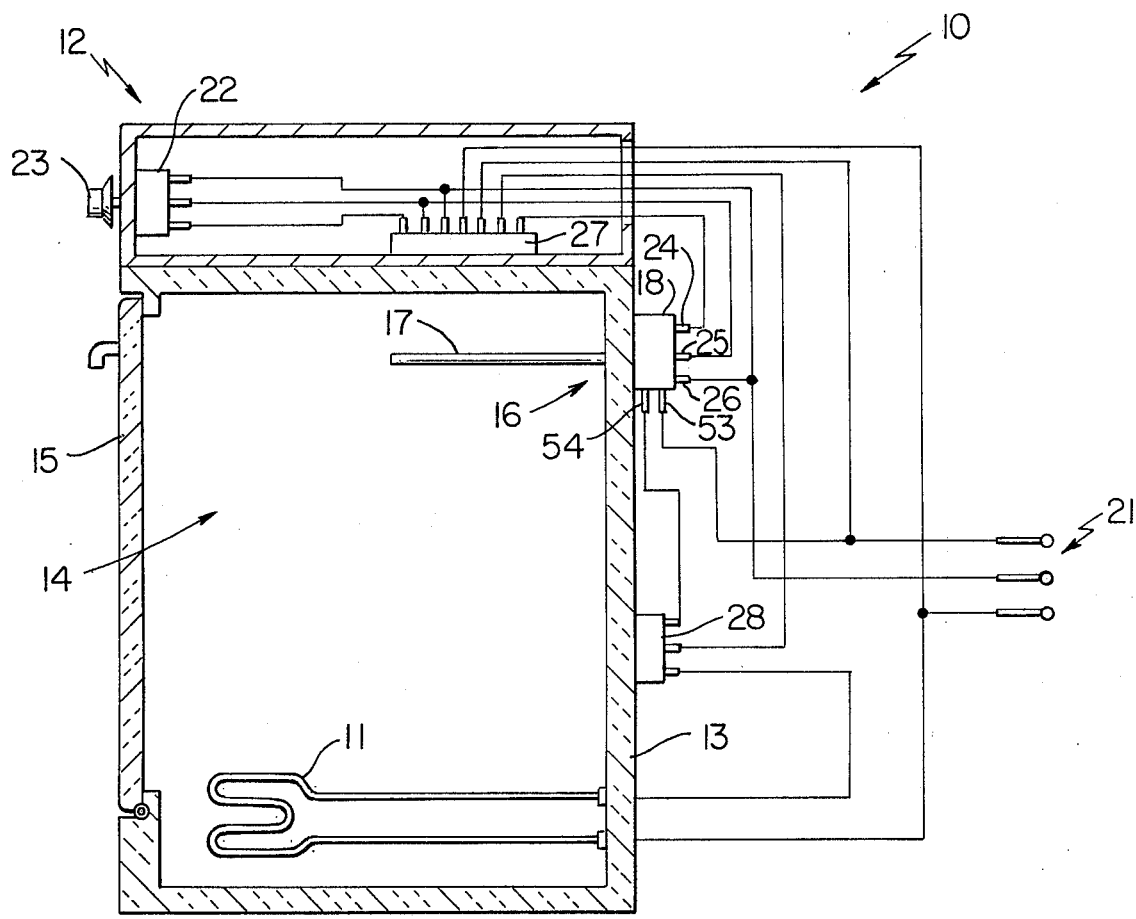
FIG. 1 is a schematic view illustrating the improved control system of this invention.

Referring now to FIG. 1, the improved control system of this invention is generally indicated by the reference numeral 10 and is utilized for controlling the operation of an electrical heater unit or means 11 of a cooking apparatus that is generally indicated by the reference numeral 12 and comprises a frame means 13 having an oven cavity 14 provided therein that is to be heated by the heater means 11 and is provided with a conventional door means 15 for access thereto.

A control unit of this invention for the control system 10 is generally indicated by the reference numeral 16 in the drawings and comprises a rod and tube temperature sensing means 17 interconnected in a manner hereinafter set forth to a housing means 18 that contains an electrical switch means that is generally indicated by the reference numeral 19 in FIG. 2 and a potentiometer that is generally indicated by the reference numeral 20 in FIG. 2.

As will be apparent hereinafter, the electrical switch means 19 is utilized as a high temperature limit switch to disconnect an electrical energy source that is generally indicated by the reference numeral 21 in FIG. 1 from the electrical heater means 11 should the temperature in the oven 14 exceed a safe high limit thereof. The potentiometer 20 of the control device 16 of this invention, in a manner hereinafter set forth, will provide an electrical signal with a value that varies with the temperature being produced in the oven 14 by the heater means 11.

The control system 10 includes a manually settable potentiometer 22 that can be of the ratiometric type so that the user can adjust the control knob 23 thereof against a suitable temperature indicating dial (not shown) to select a desired temperature that heater means 11 is to maintain in the oven 14, such as 375° F. or the like.

The ratio of resistances thus set at the manually settable potentiometer 22 are compared to ratio of resistances produced at terminal means 24, 25 and 26 of the potentiometer 20 of the control device 16 of this invention by means of a conventional comparator 27. When the comparator 27 determines that the resistance ratios of the devices 22 and 20 are identical, it will produce an electrical signal that will cause a relay 28 to operate in a manner to cause the electrical heater means or element 11 to be disconnected from the power source 21.

Therefore, as long as the temperature in the oven cavity 14 is at the selected temperature of the potentiometer 22, the heater means 11 remains disconnected from the electrical source 21 by the relay 28. However, should the output temperature in the oven cavity 14 fall below the selected temperature setting of the potentiometer 22, such lower output temperature is sensed by the control device 16 of this invention in a manner hereinafter set forth so that the signal being sent by the potentiometer 20 to the comparator 27 causes the comparator 27 to signal the relay 28 to interconnect the electrical source 21 to the heater means 11 until the temperature in the oven reaches the selected temperature. Subsequently, should the output temperature of the heater means 11 in the oven cavity 14 reach or exceed the temperature selected by the potentiometer 22, the comparator 27 causes the relay 28 to disconnect the electrical source 21 from the heater means 11 because the control device 16 has sensed a temperature above the selected temperature of the potentiometer 22 and its potentiometer 20 is sending such signal to the comparator 27 as will be apparent hereinafter.

Figure 4:
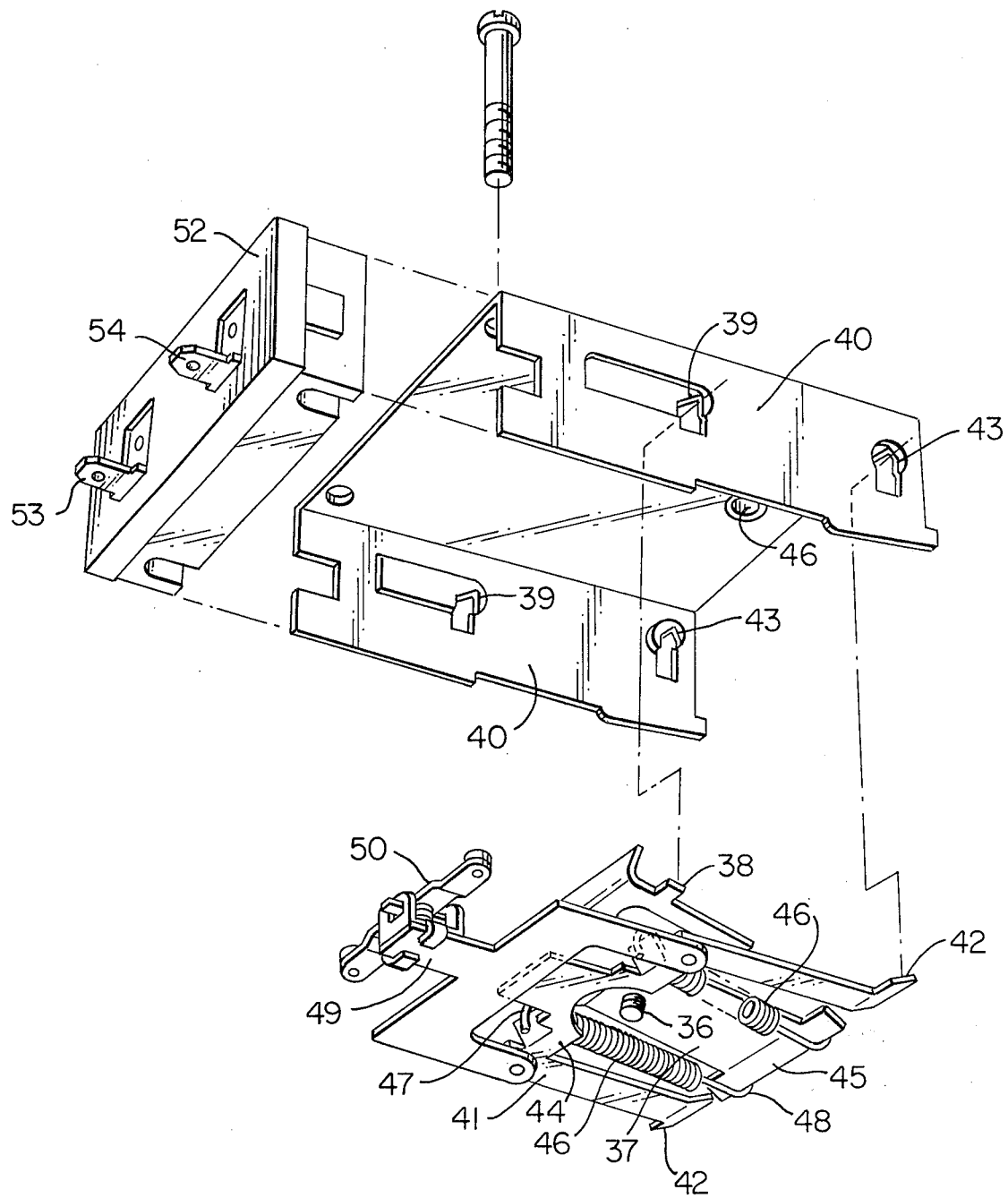
FIG. 4 is an exploded perspective view of part of the switch section of the control device of FIG. 2.

The details of the rod and tube control device 16 of this invention will now be described and reference is made to FIG. 2 wherein it can be seen that the rod and tube temperature sensing unit 17 includes a tube 29 having an open end 30 secured to the housing means 18 and a closed end 31 disposed remote therefrom, the tube 17 being formed from a metallic material that has a relatively large coefficient of thermal expansion in a manner well known in the art. A rod 32, formed of a metallic material having a relatively low coefficient of thermal expansion in a manner well known in the art, is disposed in the tube 17 and has one end 33 disposed against the closed end 31 of the tube 17 and its other end 34 projecting out of the open end 30 of the tube 17 into an internal chamber 35 of the housing means 18 to engage against a threaded adjusting member 36 carried by a switch lever 37 pivotally mounted to the housing means 18 by a pair of opposed ears 38 thereof being received in suitable fulcrum notches 39, FIG. 4, formed in opposed side walls 40 of the housing means 18.

A second switch lever 41 is also pivotally mounted in the chamber 35 of the housing means 18 by having a pair of opposed ears 42 thereof respectively pivotally mounted in fulcrum notches 43 formed in the side walls 40 of the housing means 18, a cross member 44 of the lever 41 being interconnected to a free end 45 of the first lever 37 by a pair of coiled tension springs 46 respectively having their opposed ends 47 and 48 hooked over the cross member 44 of the lever 41 and the free end 45 of the lever 37.

Figure 2:
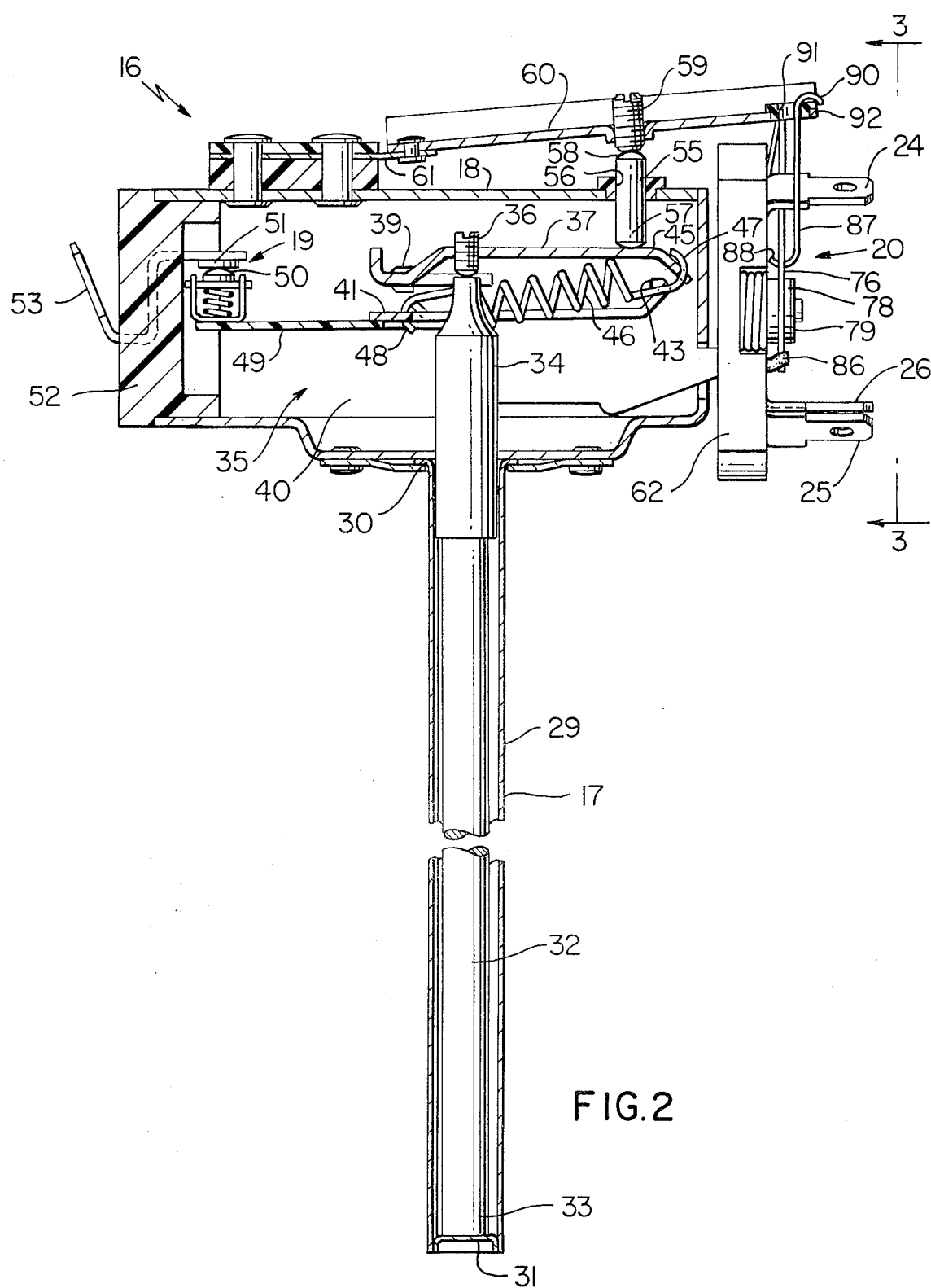
FIG. 2 is an enlarged cross-sectional view of the improved control device of this invention utilized in the control system of FIG. 1.

In this manner, the tension springs 46 are under tension between the levers 37 and 41 and normally tend to pivot the lever 37 in a clockwise direction in FIG. 2 about its pivot ears 38 and to pivot the lever 41 also in a clockwise direction in FIG. 2 about its pivot ears 42 so that the free end 49 of the lever 41 normally tends to urge and hold a bridging contact member 50 carried thereon into bridging contact with a pair of spaced apart and fixed contacts 51 carried by a terminal block 52 of the frame means 18 and being respectively interconnected to a pair of terminals 53 and 54 that project out of the terminal block 52 to be interconnected into the control system 10 in the manner illustrated.

The switch lever 37 of the control device 16 tends to follow movement of the end 34 of the rod 32 so that as the temperature being sensed by the rod and tube unit 17 increases, the tube 29 expands relative to the rod 32 and thereby causes the end 34 of the rod 32 to move downwardly in FIG. 2 as the tube 29 substantially linearly expands whereby the lever 37 pivots clockwise in FIG. 2 and causes the free end 45 thereof to move downwardly.

Should the temperature being sensed by the rod and tube unit 17 exceed the aforementioned predetermined safe temperature for the oven cavity 14, the tube 29 will have elongated in such a manner that the rod end 34 moves downwardly in FIG. 2 to a position that causes the tension springs 46 to move over center and snap the lever 41 downwardly in a counterclockwise direction to move the bridging contact member 50 thereof out of bridging contact with the fixed contacts 51 so that the now opened electrical switch 19 disconnects the electrical source 21 from the heater means 11 and prevents the heater means 11 from operating.

Therefore, it can be seen that the electrical switch 19 of this invention provides a high limit safety function for the cooking apparatus 12 to prevent a run-away high temperature condition in the oven 14 beyond a safe temperature level, the electrical switch 19 being operated by the movable part 34 of the rod and tube temperature sensing unit 17 in the manner previously described and as set forth in the aforementioned U.S. patent to Hild et al, U.S. Pat. No. 3,419,707 which patent is hereby incorporated by reference into this application.

The potentiometer 20 of the control device 16 is also operatively interconnected to the movable part 34 of the rod and tube temperature sensing unit 17 by means of a movable plunger or rod 55 passing through a suitable opening 56 in the housing means 18 so that one end 57 of the rod 55 will bear against the free end 45 of the lever 37 and the other end 58 thereof will project out of the housing means 18 and bear against a threaded adjusting member 59 carried by a lever 60 that is pivotally mounted to the housing means 18 by a flexible leaf spring member 61.

In this manner, up and down movement of the lever 60 about its fulcrum point 61 will be caused by up and down movement of the movable part 34 of the temperature sensing rod 17 so that pivotal movement of the lever 60 is in relation to the temperature being sensed by the rod and tube unit 17.

Such movement of the lever 60 linearly changes the output effect of the potentiometer 20 in a manner hereinafter set forth.

Figure 5:
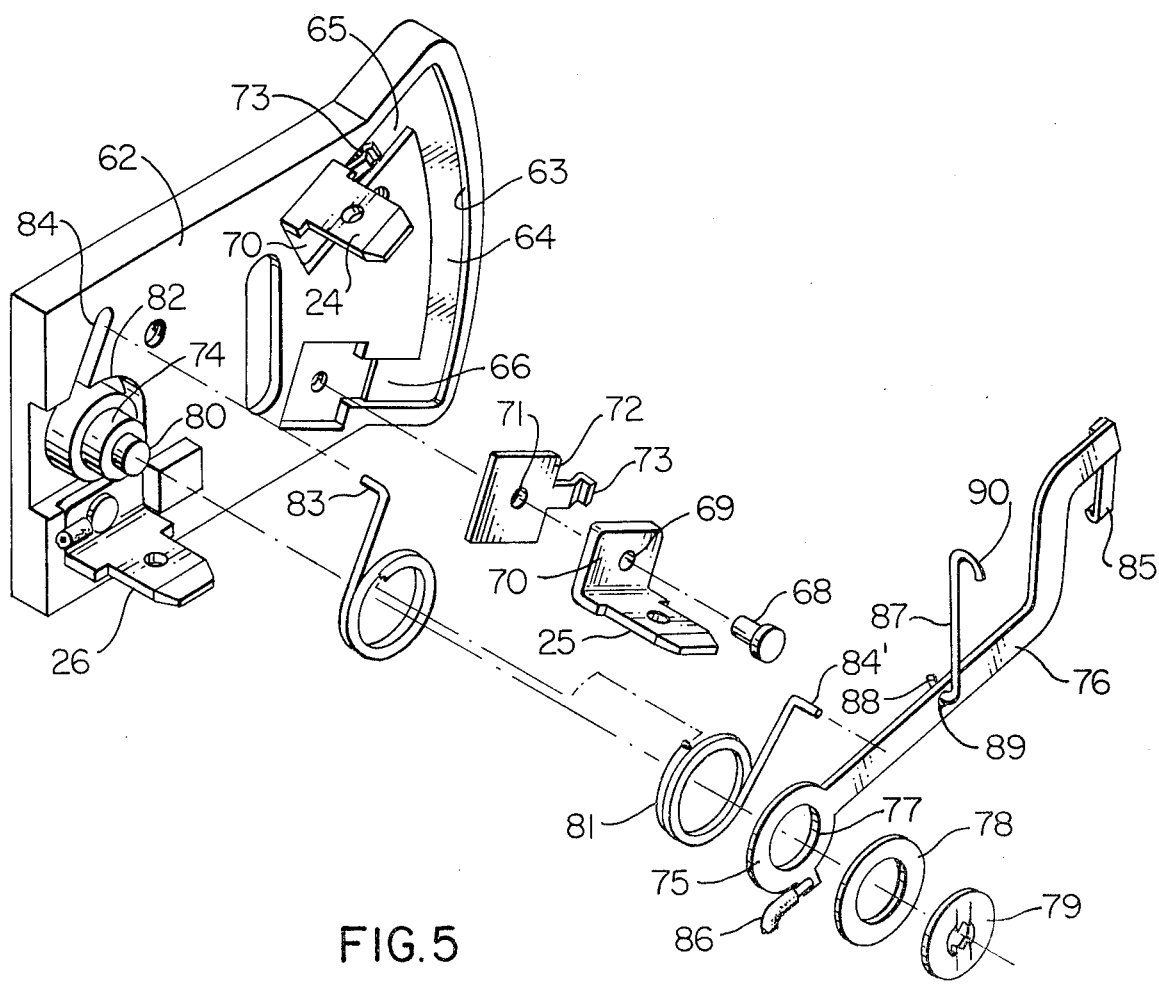
FIG. 5 is an exploded perspective view of the potentiometer section of the control device of FIG. 2.

As best illustrated in FIGS. 3 and 5, the potentiometer 20 includes a block 62 formed of any suitable electrical insulating material and having a recess 63 therein that receives a resistance element 64 that is formed in substantially ribbon form and has opposed ends 65 and 66 respectively electrically interconnected to the outwardly projecting terminals 24 and 25, the terminals 24 and 25 being fastened to the block 62 by rivet-like members 68 passing through suitable openings 69 in the legs 70 of the respective terminals 24 and 25 and similar aligned openings 71 in metallic members 72 that are disposed against the block 62 and have conductive tongues 73 bearing against the respective ends 65 and 66 of the resistance element 64.

The block 62 has an integrally formed substantially cylindrical hub 74 over which an eyelet-like end 75 of a wiper arm 76 is disposed to be rotatably mounted on the hub 74 by having its cylindrical opening 77 receiving the hub 74 therethrough. A washer 78 is disposed between the eyelet end 75 of the wiper arm 76 and a fastening member 79 that fastens to a reduced end 80 of the hub 74 in the manner illustrated in the drawings.

A coiled hair spring 81 is disposed intermediate the eyelet end 75 of the wiper arm 76 and a cavity 82 in the block 62 so that one end 83 of the spring 81 will be held in a recess 84 of the block 62 and the other end 84' will bear against the wiper arm 76 in a manner to continuously tend to rotate the arm 76 on the hub 74 in a clockwise direction as illustrated in FIG. 3 so that a wiper end 85 of the wiper arm 76 will tend to move down the resistance element 73 from its upper end 65 toward its lower end 66 by the force of the spring 81 for a purpose hereinafter described.

The wiper arm 76 is formed of conductive material and is electrically interconnected to the terminal 26 carried by the block 62 by a suitable flexible conductor 86 as illustrated.

A hook-like member 87 has one hook end 88 thereof hooked through an opening 89 formed in the wiper arm 76 while the other hook end 90 of the member 87 hooks through a suitable opening means 91 in the free end 92 of the lever 60 so that the position of the end 92 of the lever 60 relative to the housing means 18 under the influence of the movable part 34 of the rod and tube unit 17 will position the wiper end 85 of the wiper arm 76 in a corresponding position on the resistance element 64 for a purpose hereinafter described.

From the above, it can be seen that the potentiometer 20 of this invention can be formed from a relatively few parts in a simple manner to produce an output electrical signal in a manner well known in the potentiometer art that has its value in relation to the temperature sensing unit 17 as the wiper arm 76 of the potentiometer 20 is operatively interconnected to the movable part 34 of the rod and tube unit 17 to be moved in unison therewith.

Thus, it can be seen that the control device 16 of this invention has the rod and tube unit 17 thereof translate the linear movement of its part 34 to drive the transducer 20 to generate an analog electrical signal for control purposes, such as for controlling the control system 10. In addition, the movable part 34 of the rod and tube unit 17 controls the electrical switch 19 which in the control system 10 prevents the temperature in the oven cavity 14 from exceeding a safe limit.

The operation of the control system 10 utilizing the control device 16 of this invention will now be described.

Assuming that the user of the cooking apparatus 12 desires that the cooking temperature in the oven cavity 14 should be 400° F., the user turns the knob 23 of the potentiometer 22 from the "off" position thereof to its 400° F. setting so that the potentiometer 22 will provide an electrical signal to the comparator 27 that would be of the same value as the value of a signal being supplied to the comparator 27 by the potentiometer 20 of the control device 16 when the rod and tube unit 17 is sensing 400° F. in the oven cavity 14.

Therefore, initially when the potentiometer 22 is set at 400° F. and the oven cavity 14 is at room temperature, the rod and tube unit 17 has the movable end 34 of the rod 32 in such a position that the end 85 of the wiper arm 76 is close to the end 65 of the resistance member 64 in the manner illustrated in FIG. 3 so that the signal being sent by the potentiometer 20 to the comparator 27 causes the comparator 27 to operate the relay 28 in a manner to interconnect the power source 21 to the heating element 11. The heating element 11 is maintained interconnected to the power source 21 as long as the temperature in the oven cavity 14 is below the selected 400° F. However, as the temperature in the oven 14 increases from room temperature toward 400° F., the rod end 34 moves downwardly in FIG. 2 as the tube 29 elongates through the increased heating thereof so that the lever 37 moves in a clockwise direction in FIG. 2 under the force of the tension springs 46. The rod 55 follows such downward movement of the end 45 of the lever 37 and thereby causes the lever 60 to have its end 92 move downwardly under the force of the leaf spring 61 as well as the pull of the hair spring 81 whereby the wiper arm 76 has its wiper end 85 moved downwardly in FIG. 3 to change the output signal of the potentiometer 20 in such a manner that the value of the output signal reflects the temperature being sensed by the rod and tube temperature sensing unit 17.

Therefore, when the temperature of the oven cavity 14 reaches 400° F., or slightly above the same, the signal being sent by the potentiometer 20 to the comparator 27 matches the signal being sent by the potentiometer 22 to the comparator 27 so that the comparator 27 will now cause the relay means 28 to disconnect the heater element 11 from the power source 21 and will again cause the relay 28 to interconnect the power source 21 to the heating element 11 when the temperature in the oven cavity 14 falls below the selected temperature of 400° F. a certain amount.

In this manner, the comparator 27 effects a cycling on and off of the heater means 11 in a manner to tend to maintain the temperature in the oven cavity 14 at the temperature that had been selected by the setting of the potentiometer 22.

As previously stated, if for some reason, the heating element 11 should continue to operate and cause the temperature in the oven cavity 14 to not only exceed the selected temperature but reach an unsafe high temperature level, such as 800° F., the movable part 34 of the rod 32 has been moved downwardly in FIG. 2 a sufficient distance to cause the free end 45 of the lever 37 to move the tension springs 46 over center and thereby snap the lower lever 41 in a counterclockwise direction in FIG. 2 so that the bridging contact member 50 thereof separates from the fixed contacts 51. Such opening of the electrical switch 19 causes the electrical source 21 to be disconnected from the heating element 11. In this manner, it can be seen that the temperature in the oven cavity 14 cannot exceed an unsafe high temperature should other parts of the control system 10 malfunction for any reason and cause an adverse runaway temperature situation.

Therefore, it can be seen that not only does the control device 16 of this invention combine the dual function of operating the high limit electrical switch 19 for the control system 10 and generate an analog electrical signal for control purposes, so as to reduce the total system costs by combining the two functions which were separately provided in prior known systems, but also the use of a rod and tube temperature sensing unit 17 for this purpose has many other advantages.

In particular, a rod and tube unit can average temperature over a wider area than most high temperature sensors. A rod and tube unit provides a fast response time because its high movement portion can be in direct contact with the heated oven cavity. A rod and tube unit can be made from a wide variety of materials to tailor its performance of its environment. For example, stainless steel and ceramic for high temperature operation and copper and Invar rod for greater movement and sensitivity.

The combination control device 16 of this invention can sense high temperature while keeping electrical connections out of the high temperature area as the housing portion 18 is disposed outside the oven cavity 14 as illustrated in FIG. 1. This overcomes a major weakness of most high temperature sensors.

The electrical output of the control device 16 of this invention can be linear and by using the potentiometer 20 as a transducer, the output can be configured to suit various control strategies. For example, a potentiometer transducer can be used in a ratiometric configuration to have a linear voltage signal that provides better accuracy.

Also, a rod and tube sensor is an extremely reliable device so that the chance that it would fail is almost negligible. This is also true of the switch mechanism and contacts that operate from the rod and tube unit and is especially true since the switch 19 in the control system 10 of this invention is used as a limit control and operates only in the case of failure of some other part of the system 10.

It should be understood that additional electrical switches can be added to the control device 16 to perform other functions as desired.

Therefore, it can be seen that this invention not only provides an improved control system and control device therefor, but also this invention provides improved methods of operating such a control system and making such a control device.

While the forms and methods of this invention now preferred have been illustrated and described as required by the Patent Statute, it is to be understood that other forms and method steps can be utilized and still fall within the scope of the appended claims.

What is claimed is:

1. In a control system for a heating means that has control means for comparing a variable electrical signal that has a value in relation to the output temperature of said heating means and a selected electrical signal that has a value in relation to a selected temperature setting to control the operation of said heating means to tend to produce an output temperature substantially equal to said selected temperature, the improvement wherein said control means comprises a control device having a rod and tube temperature sensing unit for providing linear motion of a part thereof in relation to the output temperature of said heating means and having a potentiometer provided with an electrical output producing means operatively interconnected to said part of said unit so as to produce said variable electrical signal in relation to the output temperature of said heating means, and means for terminating the operation of said heating means when the output temperature of said heating means exceeds a predetermined temperature, said means for terminating the operation of said heating means being operatively interconnected to said part of said control device, said means for terminating the operation of said heating means comprising an electrical switch carried by said control device and having a movable switching member, said unit comprising a tube means and a rod means, said rod means comprising said part of said unit and abutting said switching member to control movement thereof, a lever means pivotally mounted to said device and being operatively interconnected to said output producing means of said potentiometer to control the same in relation to movement of said lever means, and a movable plunger carried by said device and having opposed ends respectively abutting said switching member and said lever to translate movement of said switching member to said lever means and, thus, said linear motion of said rod means to said output producing means of said potentiometer.

2. In a control device having a rod and tube temperature sensing unit for providing linear motion of a part thereof in relation to the temperature being sensed by said unit, the improvement comprising a potentiometer carried by said device and having electrical output producing means operatively interconnected to said part of said unit so as to have the electrical output of said potentiometer controlled in relation to the temperature being sensed by said unit, said electrical output producing means of said potentiometer comprising a wiper arm pivotally mounted to said control device, lever means pivotally mounted to said device and operatively interconnecting said part of said unit to said wiper arm, and an electrical switch carried by said device and having a movable switching member therefor, said unit comprising a tube means and a rod means, said rod means comprising said part of said unit and abutting said switching member to control movement thereof, and a movable plunger carried by said device and having opposed ends respectively abutting said switching member and said lever means to translate movement of said switching member to said lever means and, thus, said linear motion of said rod means to said wiper arm.

* * * * *